S. JONES.
MECHANICAL MOVEMENT.
APPLICATION FILED APR. 24, 1908.

901,912.

Patented Oct. 20, 1908.

2 SHEETS—SHEET 1.

WITNESSES
W. M. Avery
A. H. Davis

INVENTOR
Samuel Jones
BY Munn & Co
ATTORNEYS

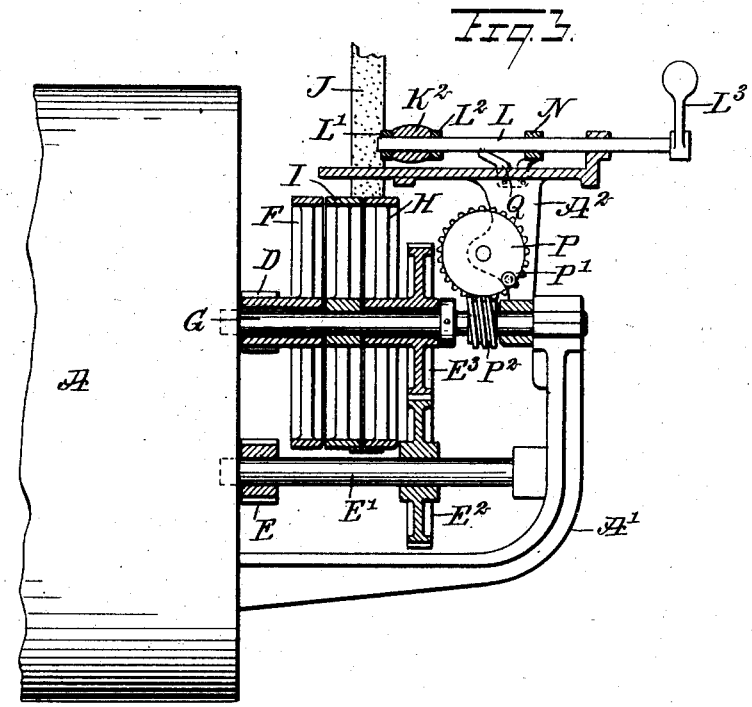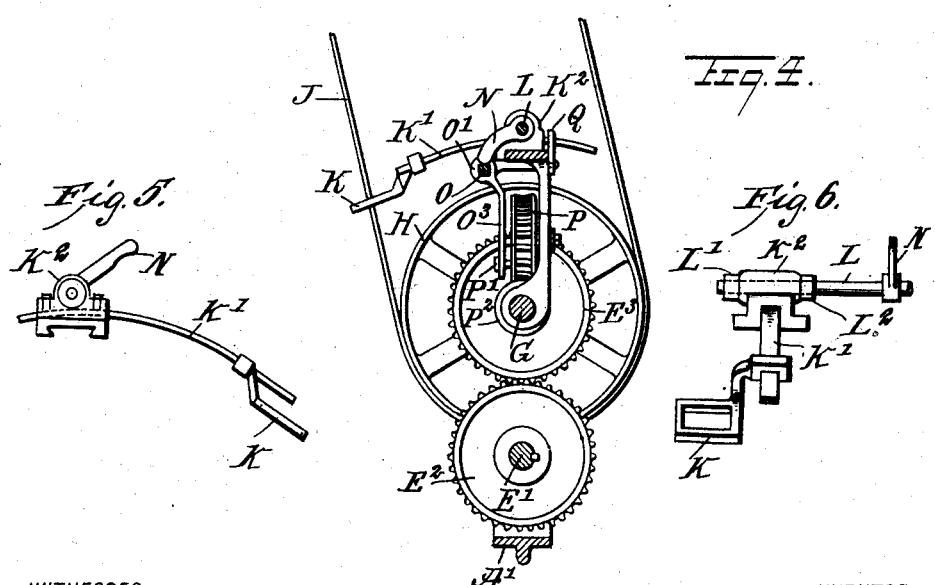

UNITED STATES PATENT OFFICE.

SAMUEL JONES, OF EAST LIVERPOOL, OHIO.

MECHANICAL MOVEMENT.

No. 901,912.  Specification of Letters Patent.  Patented Oct. 20, 1908.

Application filed April 24, 1908. Serial No. 428,905.

*To all whom it may concern:*

Be it known that I, SAMUEL JONES, a citizen of the United States, and a resident of East Liverpool, in the county of Columbiana and State of Ohio, have invented a new and Improved Mechanical Movement, of which the following is a full, clear, and exact description.

The invention relates to mechanical movements for converting continuous rotary motion in one direction into alternate forward and backward rotary motion.

The object of the invention is to provide a new and improved mechanical movement for use on washing machines, churns and like machines, and arranged to automatically revolve a part of the machine a predetermined number of times alternately in opposite directions and with the use of only a single driving belt.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
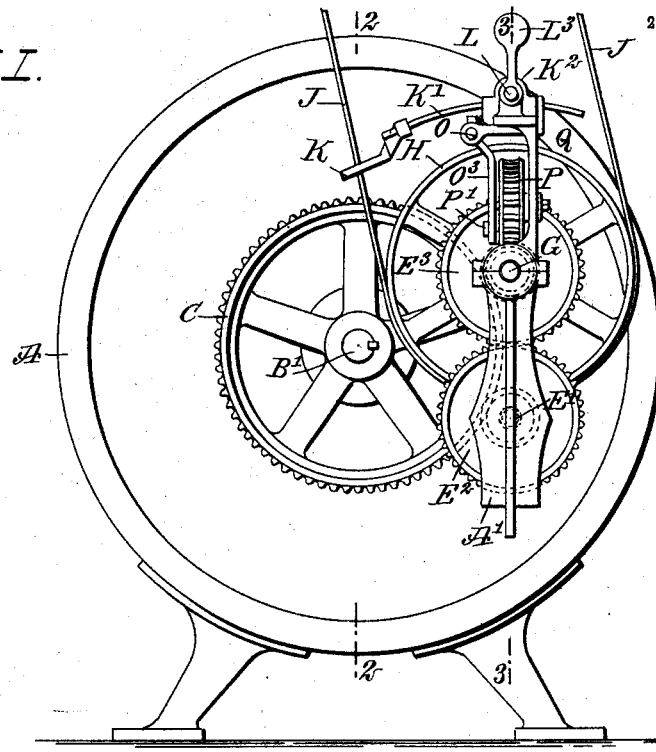
Figure 2:
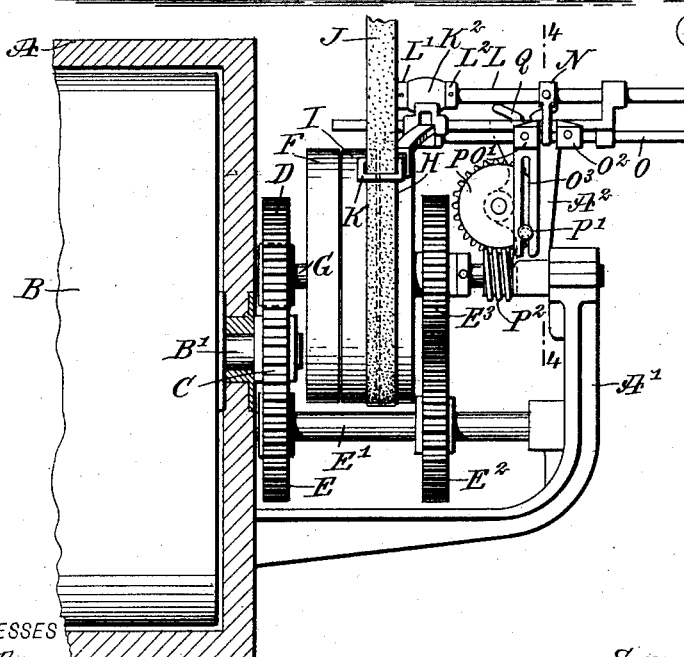

Figure 1 is an end elevation of the improvement as applied to a washing machine; Fig. 2 is a longitudinal central section of the same on the line 2—2 of Fig. 1 showing the gearing in elevation; Fig. 3 is a longitudinal sectional elevation of the same on the line 3—3 of Fig. 1; Fig. 4 is a transverse section of the improvement on the line 4—4 of Fig. 2, and Figs. 5 and 6 are side and end views respectively of the belt shifter.

In the casing A of the washing machine is mounted to rotate the cylinder B having its shaft B' extending through one end of the casing A, as indicated in Fig. 2, and on the outer end of the said shaft B' is secured a gear wheel C in mesh with pinions D and E, of which the pinion D is secured or formed on the hub of a loose pulley F mounted to turn loosely on a shaft G journaled in suitable bearings, of which one is in the end of the casing A and the other in a bracket A' attached to the casing A. The pinion E is secured on a shaft E' journaled in the casing A and the bracket A', and on the said shaft E' is secured a gear wheel $E^2$ in mesh with a gear wheel $E^3$ attached to or formed on the hub of another loose pulley H mounted to rotate loosely on the shaft G.

Between the loose pulleys F and H is arranged a driving pulley I secured on the shaft G and this driving pulley I is at all times engaged by a belt J adapted to be partly shifted alternately onto the loose pulleys F and H, so as to rotate the same, at the same time, however, keeping up the rotary motion given to the pulley I and its shaft G. Now when the belt J is in engagement with the pulley H, the cylinder B is rotated in one direction by the gear wheels $E^2$, $E^3$, shaft E', pinion E and the gear wheel C, and when the belt J is shifted onto the pulley F the latter is rotated so as to turn the cylinder B in the reverse direction by the pinion D and the gear wheel C.

The belt J is partly shifted from the pulley I alternately onto the pulleys F and H by a belt-shifting mechanism actuated from the continually driven shaft G, and for this purpose the following arrangement is made: The belt J is engaged by a belt shifter K having its rod K' provided with a hub $K^2$ held on a shifter rod L between collars L' and $L^2$, as plainly indicated in Fig. 3. The shifter rod L is mounted to turn and to slide in suitable bearings arranged on a bracket $A^2$ forming part of the bracket A', and on the shifter rod L is arranged a handle $L^3$ under the control of the operator.

On the shifter rod L is secured an arm N adapted to extend between collars O', $O^2$ secured on a slide O, mounted to slide longitudinally on the bracket $A^2$ parallel to the rod L. The collar O' is provided with a slotted arm $O^3$ engaged by a wrist pin P' held on the face of a worm wheel P journaled in suitable bearings arranged on the bracket $A^2$. The worm wheel P is in mesh with a worm $P^2$ secured on the driven shaft G, so that the rotary motion of the shaft G is transmitted by the worm $P^2$ to the worm wheel P, which by the wrist pin P' acting on the arm $O^3$ causes a continuous forward and backward motion of the slide O, so that the arm N is carried along and with it the shifter rod L and shifter to shift the belt J alternately onto the pulleys F and H, as previously mentioned.

The gearing is so proportioned that the shifting of the belt J takes place whenever the cylinder B has made say three revolutions, that is, after three revolutions in one direction the belt is shifted so that the cylinder B is rotated three times in the opposite direction, and so on. When it is desired to stop the machine, the operator swings the handle L³ over so as to swing the arm N out of engagement with the collars O', O², and then the operator shifts the rod L in the direction of its length and engages the arm N with a fork Q attached on the bracket A². When this takes place the belt J is in engagement with the driving pulley I only, and is held in this position, it being understood that although the slide O keeps up its movement it does not actuate the rod L, as the arm N is out of engagement with the collars O', O², and hence the belt is not shifted.

In practice, it is desirable to make the driven pulley I somewhat wider than the loose pulleys F and H and to use the belt J having a width corresponding approximately to that of the pulley I, so as to readily engage the pulley I and at the same time either pulley F or H.

The mechanical movement shown and described is very simple and durable in construction, and composed of comparatively few parts, not liable easily to get out of order.

Having thus described my invention, I claim as new and desire to secure by Letters Patent:

1. A mechanical movement comprising a shaft, a driving pulley secured thereon, loose pulleys on the said shaft on opposite sides of the said driving pulley, gearings connecting the said loose pulleys with the part to be driven, a driving belt for the said pulleys, and an automatic belt shifter for the said belt and actuated from the said shaft.

2. A mechanical movement comprising a shaft, a driving pulley secured thereon, loose pulleys on the said shaft on opposite sides of the said driving pulley, gearings connecting the said loose pulleys with the part to be driven, a driving belt for the said pulleys, a belt shifter for the said belt, and an actuating mechanism connecting the said shaft with the said belt shifter to actuate the latter.

3. A mechanical movement comprising a shaft, a driving pulley secured thereon, loose pulleys on the said shaft on opposite sides of the said driving pulley, gearings connecting the said loose pulleys with the part to be driven, a driving belt for the said pulleys, a belt shifter mounted to slide and engaging the said belt, a slide engaging the said belt shifter for shifting the latter, a worm wheel having a wrist pin engaging the said slide, and a worm on the said shaft and in mesh with the said worm wheel.

4. A mechanical movement comprising a shaft, a driving pulley secured thereon, loose pulleys on the said shaft on opposite sides of the said driving pulley, gearings connecting the said loose pulleys with the part to be driven, a driving belt for the said pulleys, a worm on the said shaft, a worm wheel in mesh with the said worm and provided with a wrist pin, a slide having spaced collars, of which one terminates in a slotted arm engaged by the said wrist pin, and a belt shifter engaging the said belt and having a lug extending between the said collars.

5. A mechanical movement comprising a shaft, a driving pulley secured thereon, loose pulleys on the said shaft on opposite sides of the said driving pulley, gearings connecting the said loose pulleys with the part to be driven, a driving belt for the said pulleys, a worm on the said shaft, a worm wheel in mesh with the said worm and provided with a wrist pin, a slide having spaced collars, of which one terminates in a slotted arm engaged by the said wrist pin, a belt shifter engaging the said belt and comprising a rod mounted to slide and to turn, a lug on the said rod extending between the said collars, and a fork for the reception of the said lug on turning the said rod.

In testimony whereof I have signed my name to this specification in the presence of two subscribing witnesses.

SAMUEL JONES.

Witnesses:
J. P. HERBERT,
SAMPSON BILLS.